United States Patent [19]

Hiraoka et al.

[11] Patent Number: 4,955,498
[45] Date of Patent: Sep. 11, 1990

[54] SEALING STRUCTURE OF PRESSURE CONTAINER

[75] Inventors: Eiichi Hiraoka, Tokyo; Junji Onaka, Iruma, both of Japan

[73] Assignee: Sumitomo Heavy Industries, Ltd., Tokyo, Japan

[21] Appl. No.: 378,679

[22] Filed: Jul. 12, 1989

[30] Foreign Application Priority Data

Jul. 15, 1988 [JP] Japan .................. 63-92995[U]

[51] Int. Cl.⁵ ............................................. F16J 15/16
[52] U.S. Cl. .................................. 220/3; 220/378; 277/103
[58] Field of Search .............. 220/3, 378; 277/103, 277/174, 217, 216

[56] References Cited

U.S. PATENT DOCUMENTS

| | | | |
|---|---|---|---|
| 3,195,422 | 7/1965 | Corwin | 220/378 |
| 3,411,655 | 11/1968 | Gaines | 220/3 |
| 3,693,822 | 9/1972 | Thillet | 220/378 |
| 4,310,162 | 1/1982 | Donovan | 220/3 |
| 4,443,016 | 4/1984 | Schungel | 220/378 |
| 4,444,331 | 4/1984 | Lankston | 220/378 |
| 4,466,550 | 8/1984 | Sullivan | 220/378 |
| 4,582,212 | 4/1986 | Asari | 220/3 |
| 4,589,564 | 5/1986 | Olster et al. | 220/3 |
| 4,602,480 | 7/1986 | Hill et al. | 220/3 |
| 4,652,000 | 3/1987 | O'Rourke | 277/103 |
| 4,739,899 | 4/1988 | Thompson et al. | 220/378 |
| 4,867,460 | 9/1989 | Colo | 277/216 |

FOREIGN PATENT DOCUMENTS 1253681 11/1967 Fed. Rep. of Germany .
63-158396 7/1988 Japan .

Primary Examiner—Stephen Marcus
Assistant Examiner—S. Castellano
Attorney, Agent, or Firm—Armstrong, Nikaido, Marmelstein, Kubovcik & Murray

[57] ABSTRACT

A pressure container comprises a cylindrical body having open portions at the front and rear ends thereof and a body 1 which has end wall portions at both ends connected to each other by a connection portion and which is slidably engaged in the cylindrical body and forwardly pushed out therefrom so as to receive a sample in the body, a front packing being provided on the front end wall portion and a rear packing being provided on the side of the cylindrical body for the purpose of sealing between the two end wall portions and the cylindrical body, the sealing surfaces of the front and rear packings having the same diameter. The front and rear packings disposed in the above-described manner prevent the fluid in the pressure container from contacting the sliding surfaces of the packings and thus eliminate any danger of damaging the sealing surfaces of the packings owing to foreign matter.

1 Claim, 2 Drawing Sheets

SEALING STRUCTURE OF PRESSURE CONTAINER

BACKGROUND OF THE INVENTION

1. Field of the Invention

The present invention relates to a sealing structure of a pressure container such as an extraction tank which is a main component of the apparatus used for performing, for example, supercritical extraction methods, and which is used under operational pressure as high as 200 to 300 kg/cm$^2$G.

2. Description of Prior Art

The applicant invented a pressure container comprising a cylindrical body 2' and two covers 1'a, 1'b which are respectively engaged in the open portions at both ends of the cylindrical body 2', the two covers being combined with each other by means of tie rods 1'c to form a body 1' as one unit which is forwardly pushed out of the cylindrical body 2' by a guide shaft 4' operated by a cylinder 5' so that a sample is discharged from and received in the body 1'. This invention was filed as Japanese Patent Application No. 61-305837 (referred to as the "prior invention").

In the pressure container disclosed in this application, the covers 1'a, 1'b which are respectively tightly engaged in the front and rear open portions of the cylindrical body 2' are combined with each other by the three tie rods 1'c in a state wherein they are opposite to each other at a distance which allows the covers to be simultaneously tightly engaged in the open portions of the cylindrical body 2' through packing 3' provided on the inner surfaces in the front and rear open portions.

Such a container comprising the packings 3' which are provided in the front and rear portions of the cylindrical body 2', however, has the disadvantage that foreign matter contained in the fluid in the cylindrical body 2' adheres to the surface of the packing 3' on the front side and causes damage to the packing 3' and hence deterioration of the sealing performance thereof, as well as a great danger of reducing the life of the packing 3'.

Accordingly, it is an object of the present invention to provide a structure for providing a packing which is capable of resolving the problem involved in the packing 3' disclosed in the prior invention and increasing the life of the packing 3'.

SUMMARY OF THE INVENTION

The present invention provides a sealing structure of a pressure container which comprises a cylindrical body having open portions at the front and rear ends and an inner body having a front end wall portion, a rear end wall portion, a connection portion for connecting the two wall portions and a space for receiving a sample in the inner body, the inner body being forwardly pushed out from the cylindrical body in the axial direction when the sample is discharged from and received in the body, and which is characterized in that, in order to seal between the two wall portions and the cylindrical body, a front packing is provided disposed within a groove on the front wall portion of said inner body and a rear packing is provided within a groove on the portion of the cylindrical body which opposes the rear end wall portion, on said front and rear packings having inner and outer diameters wherein the outer diameter of said front packing comprises a sealing surface thereof and the inner diameter of said rear packing comprises a sealing surface thereof, and wherein the outer diameter of said front packing and the inner diameter of said rear packing are substantially equal.

DETAILED DESCRIPTION OF PREFERRED EMBODIMENT

A description will be given with reference to FIGS. 1 and 2.

Figure 1:
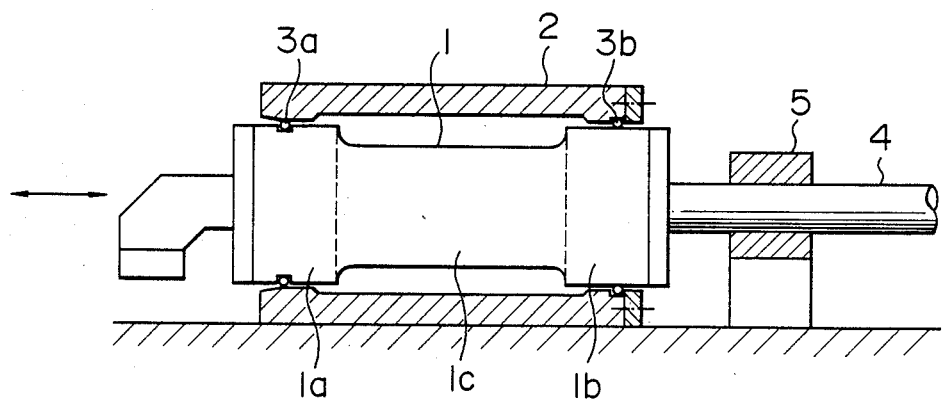
FIG. 1 is a drawing of a pressure container to which the present invention is applied.

In FIG. 1, reference numeral 1 denotes a body of a pressure container and reference numeral 2 denotes a cylindrical body which forms a barrel. The body 1 comprises two end wall portions 1a, 1b which respectively correspond to the covers 1'a, 1'b of the prior invention and a connection portion 1c for connecting them which corresponds to the tie rods 1'c. The connection portion 1c is formed integrally with the end wall portions 1a, 1b by hollowing along the two parallel surfaces of a cylindrical body to form a shape symmetrical in the longitudinal direction. The hollow portion cut out along the parallel surfaces serves as a space for receiving a sample.

Reference numeral 3a denotes a front packing which is provided inside a groove on the front end wall portion 1a on the body side. Reference numeral 3b denotes a rear packing which is provided inside a groove on the interior circumference of cylindrical body 2. On the rear end wall portion 1b is provided one guide shaft 4 which extends in the lengthwise direction of the cylindrical body 2 and which is supported by a bearing 5 (see FIG. 1) in such a manner that it is slidable only forwardly from the position shown in FIG. 1.

In order to equalize the axial loads applied to the front and rear end wall portions owing to the internal pressure, the diameters of the surfaces 6, 7 of about which the front and rear packings 3a, 3b slide are set to the same value. Accordingly, the outer diameter of packing 3a, which acts as the sealing surface thereof, substantially equals the inner diameter of packing 3b, wherein the inner diameter of packing 3b acts as the sealing surface for the packing 3b. The diameters of the front and rear packings 3a, 3b are therefore different.

A description will be made with reference to FIG. 2.

Figure 2:
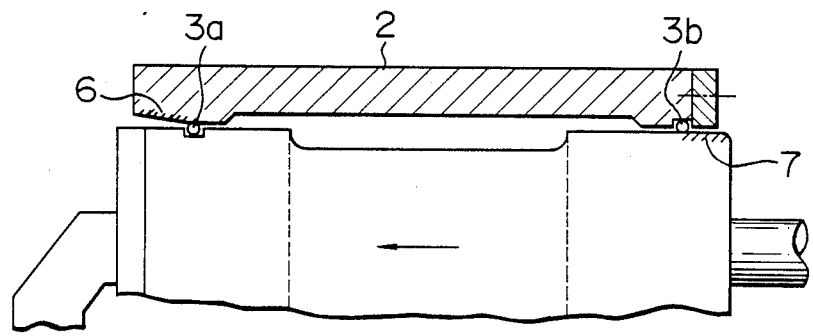
FIG. 2 is an explanatory view which shows the sliding portions of packings.
Figure 3:
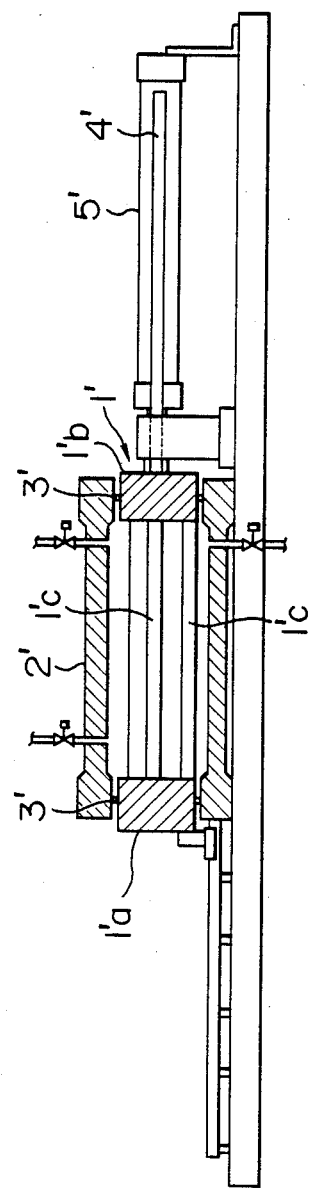
FIG. 3 is a schematic explanatory view of a prior invention.
Figure 4:
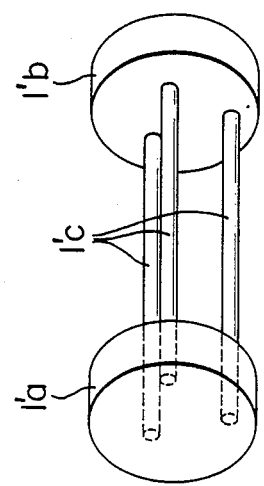
FIG. 4 is a perspective view of the body of the same.

Since the front packing 3a is provided on the front end wall portion 1a on the body side, and the rear packing 3b is provided on the side of the cylindrical body, the sliding surface 6, 7 of the packings are as shown by the shadow portions in FIG. 2. Since the sliding surfaces 6, 7 are exposed to air during the operation of the apparatus and do not contact the fluid in the cylindrical body, no foreign matter in the fluid adheres to the sliding surfaces 6, 7. If the body 1 is forwardly slid after the internal fluid has been discharged for the purpose of discharging and receiving the sample, therefore, there is no danger of damaging the seal surfaces of the packings 3a, 3b with foreign matter.

As shown in FIG. 2, since the sliding surfaces 6, 7 are respectively placed on the side of the cylindrical body 2 at the front end and on the side of the body 1 at the rear end and do not contact the internal fluid, no foreign matter adheres thereto. There is therefore no danger of damaging the packings, and an attempt can be made to increase the life of the packings.

What is claimed is:

1. A pressure container and sealing structure therefor comprising a cylindrical body having open portions at the front and rear ends and an inner body having a front end wall portion, a rear end wall portion, a connection portion for connecting said two wall portions and a space for receiving a sample, said inner body being forwardly pushed out of said cylindrical body in the axial direction when said sample is discharged from or received in said pressure container, said structure being characterized in that, in order to make a seal between said two wall portions and said cylindrical body, a front packing is provided disposed in a groove on said front wall portion and a rear packing is provided disposed in a groove on a portion of said cylindrical body which opposes said rear end wall portion, said front and rear packings each having inner and outer diameters wherein the outer diameter of said front packing comprises a sealing surface thereof and the inner diameter of said rear packing comprises a sealing surface thereof, wherein the outer diameter of said front packing and the inner diameter of said rear packing are substantially equal.

* * * * *